United States Patent

[11] 3,607,548

| | | |
|---|---|---|
| [72] | Inventors | Viggo Rasmus Hansen<br>Naestved;<br>Per Juel Hagemeister, Glostrup, both of Denmark |
| [21] | Appl. No. | 765,183 |
| [22] | Filed | Oct. 4, 1968 |
| [45] | Patented | Sept. 21, 1971 |
| [73] | Assignee | C. A. Harnden Limited<br>Hyde, Cheshire, Great Britain |
| [32] | Priority | Oct. 10, 1967 |
| [33] | | Denmark |
| [31] | | 5039 |

[54] WELDING MACHINE FOR PLASTIC FOIL WEB
7 Claims, 1 Drawing Fig.

[52] U.S. Cl. .................................................... 156/358
[51] Int. Cl. .......................................... G05g 23/02
[50] Field of Search............................................ 156/361, 252, 358, 253, 507, 502

[56] References Cited
UNITED STATES PATENTS

| | | | |
|---|---|---|---|
| 3,053,723 | 9/1962 | Plach et al. ..................... | 156/252 |
| 3,473,288 | 10/1969 | Nakamura et al. ........... | 156/253 |

FOREIGN PATENTS

| | | | |
|---|---|---|---|
| 1,147,379 | 4/1963 | Germany...................... | 156/507 |

*Primary Examiner*—Benjamin A. Borchelt
*Assistant Examiner*—Daniel A. Bent
*Attorney*—Dodge and Ostmann

ABSTRACT: A machine for carrying out transverse weldings and perforations in a web of plastic foil, in which the foil web is advanced in stages, having supplying means for the web and means for welding and perforating. The advancing means is positioned between the supplying means and the treatment means. A mechanism is provided for keeping the section of the web between the advancing means and the treatment means slackened during the welding operation, the perforating means forming part of this mechanism.

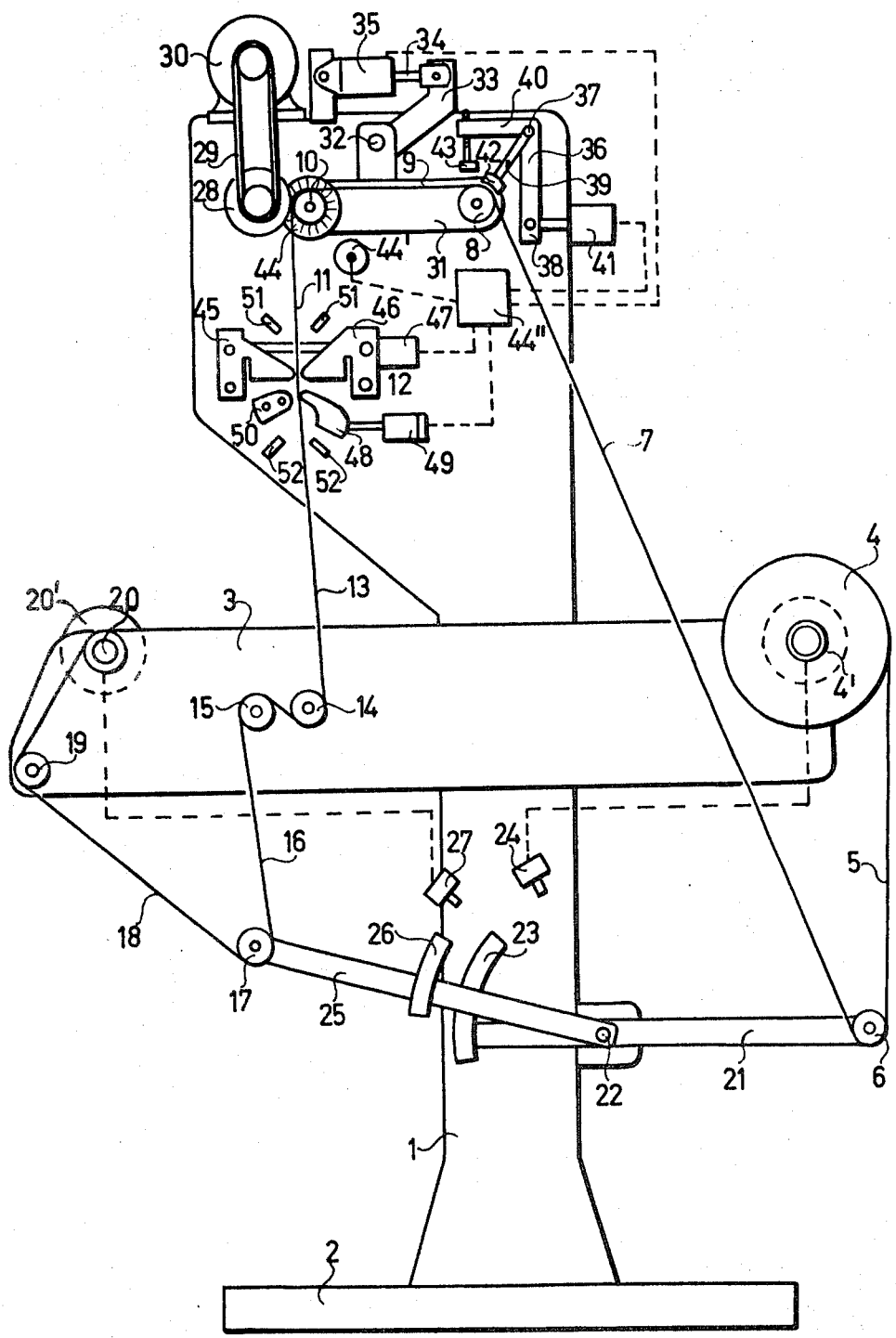

WELDING MACHINE FOR PLASTIC FOIL WEB

BACKGROUND OF THE INVENTION

Known welding machines for plastic foil web are formed in such manner that the foil web is moved substantially horizontally through the machine, which is therefore of considerable length, and this makes it in the first place space-consuming and, in the second place, inconvenient to operate. With the known welding machines the material is often weakened near the welding seam, which is due to the fact that the foil web is subject to a certain tension at the welding operation, by which the material located near the welding and plasticized by the welding heat is stretched and reduced in thickness. This drawback of the known welding machines makes it necessary to use foils which are substantially thicker than what would have been necessary, were no such weakening to be expected.

SUMMARY OF THE INVENTION

It is the object of the present invention to provide a machine of the kind referred to in the introduction and which occupies little space, is easy to operate and capable of performing weldings without causing weakenings of the material.

A device according to the invention comprises supplying means for carrying out transverse weldings, and, if desired, to form perforations in a web of plastics foil comprising supplying means for the web, welding means and, if desired perforating means, hereinafter called treatment means, adapted to clamp the section of the web which is being treated, driving means, positioned between the supplying means and the treatment means, and adapted to advance the web in stages through the treatment means, and a mechanism adapted to keep the section of the web between the driving means and the treatment means slackened during the treatment.

BRIEF DESCRIPTION OF THE DRAWING

One embodiment example of the invention is represented in simplified form in the drawing, which shows a diagrammatical side view of a welding and perforating machine.

DESCRIPTION OF THE PREFERRED EMBODIMENT

The machine has a frame 1 on a base 2 which can be attached to the floor of the workshop. The frame has a horizontal table 3 carrying (in the right-hand side of the Figure) a feed roller 4 for a web of plastics foil which is guided down (section 5) and around a guiding roller 6 upwards (section 7) to another guiding roller 8 from which the web is passed horizontally (section 9) and over a freely running idle roller 10, continuing vertically downwards (section 11) and through a welding and perforating unit 12, from which the web travels down (section 13) and over two guiding rollers 14 and 15 which have fixed axes. From the guiding roller 15 the web is passed downwards (section 16) to a guiding roller 17 and from there obliquely upwards and outwards (section 18) to a guiding roller 19, from which the web is passed to a takeup roller 20 resting on the table 3.

The guiding roller 6 is carried by a first end of a tilting two-arm lever 21 which can turn about a shaft 22 which is stationary in relation to the frame 1. The second end of the tilting lever 21 carries an arcuate activating member 23 adapted to operate a switch 24 which controls a driving motor 4' for the feed roller 4. The driving motor 4' for the feed roller 4 operates when the first end of the tilting lever 21 is in its raised position, in which the switch is unactivated. When the said first end of the tilting lever 21 drops and the member 23 acts upon the switch 24, the motor 4' is stopped.

A corresponding arrangement applies to the takeup roller 20. Here the guiding roller 17 is carried by a tilting member 25 which is also rotatable about the shaft 22 and carries an activating member 26 adapted to act upon a switch 27. The driving motor 20' for the takeup roller 20 operates when the tilting member 25 is in its lowered position so that the switch 27 is unactivated. When the tilting member 25 is raised and the switch 27 is acted upon, the motor stops. The mechanisms described serve to equalize the tension to which the web is subjected.

The machine serves to produce transverse weldings and perforations in the continuous web of foil which has therefore to be moved in stages through the welding and perforating unit 12, as the welding operations are to be performed in the intervals of standstill. The said movement is effected by means of a driving roller 28 which is kept in continuous rotation by an electromotor 30 and a belt 29. The driving roller 28 is in contact with the surface of the idle roller 10 and rotates in clockwise direction so that the web passes to the left and over the idle roller 10 vertically downwards.

The idle roller 10 is carried by a tilting arm 31 which can swing about a shaft 32 and is rigidly connected to an arm 33 which in turn is connected by a piston rod 34 to a pneumatic motor 35 controlled from an electropneumatic control device 44'' having a counting device and a program device. By means of the motor 35 the tilting arm 31 can be tilted in such manner that the idle roller 10 is moved away from the driving roller 28 and down towards the welding and perforating unit 12.

A three-arm lever 36, tiltable about a shaft 37, which is stationary relative to the frame 1, is provided in the vicinity of the guiding roller 8. The vertically extending arm 38 of the lever is joined to a pneumatic motor 41, which is controlled by the device 44''. The oblique arm 39 is resilient and carries a brake shoe 42, while the horizontal arm 40 carries a stop 43. The position of the stop 43 can be changed by means of the motor 41.

At one end of the idle roller 10 is provided a disc 44 having along its circumference a large number of radial slits. A photoelectric cell 44', connected to the device 44'' is provided adjacent the said disc 44. By scanning of the slits the number of revolutions of the idle roller 10 may be sensed, and the control device may be adapted to actuate the motor 35 when a predetermined number of slits have passed the photocell so that the roller 10 is moved away from the driving roller 28 and the movement of the web is stopped. In this simple manner it is possible to provide a very exact measurement of the distance between the welds which is identical with the length of foil web moving in each state, though corrections have, of course, to be made for slip and delays of the control device.

The welding and perforating unit 12 comprises two rail-shaped welding jaws 45 and 46, of which one, 45, is rotatable about a center of rotation located at one end of the rail, so that welding tools can be readily inspected and operated. The welding jaws are moved towards each other and away from each other by means of a pneumatic motor 47 which in turn is controlled by the said control device 44''; heating bodies may, if desired, also be regulated from same.

Directly below the welding jaws is provided a perforating member 48 which is connected to a pneumatic motor 49 adapted to move the perforating member 48 towards the foil web section 13 and press it against a holder member 50. Directly above the welding jaws are two cooling air nozzles 51, adapted to direct a fine stream of cooling air against the foil web section 11, and beneath the perforating member 48 are other cooling air nozzles 52, adapted to direct fine streams of air against the foil web section 13.

The operation of the machine will now be described, but the apparatus and the means which automatically control the various functions will not be described in detail, since ordinary programming and control means may be used for this purpose. The foil web is moved in stages through the welding and perforating unit 12 by means of the driving roller pair 28 and 10 and during this movement the foil web is taken from the sections 5 and 7 so that the guiding roller 6 is lifted. As soon as the switch 24 is released, the driving motor 4' for the feed roller 4 is started, and this unwinds more foil web so that the guiding roller 6 is again able to sink, and the web sections 5 and 7 are extended. The said extension continues until the switch 24 is reactivated, that is, when the guiding roller 6 has got rather far down, and the driving motor of the feed roller 4 is then stopped so that the driving roller pair 28, 10 can pull the foil web from the sections 5, 7 without having to overcome any appreciable resistance.

Along the sections 11 and 13 the foil web moves down by gravity and as soon as the web is released by the driving rollers 28, 10 and the welding and perforating unit by the tension exerted by the roller 17, and during the downwards movement of the web the sections 16 and 18 increase in length, and the guiding roller 17 may sink, carrying with it the tilting member 25. When the member 26 has released the switch 27, the amount of material in the sections 16 and 18 is sufficient to permit the takeup roller 20 to wind the foil web. When the takeup roller 20 has wound so much of the foil web from the sections 16 and 18 that the tilting member 25 tilts upwards and the switch 27 is activated upon, the motor 20′ for the takeup roller 20 stops so that the guiding roller 17 is again able to sink.

At the beginning of the stepwise movement of the foil web the idle roller 10 is forced against the driving roller 28, and the brakeshoe 42 is moved away from the foil web, just as the welding jaws 45 and 46 and the perforating member 48 are located at a distance of the web. The web is then moved in such manner that the sections 11 and 13 move downwards, and the duration of this movement is determined by the said photocell 44′ and the device 44″. As soon as the predetermined number of slits provided in the disc 44 have passed the photocell 44′, a signal is transmitted to the control device 44″ which activates the motor 35, so that the idle roller 10 is moved away from the driving roller 28. At the same time the end of the arm 31, which carries the guiding roller 8, moves upwards until it touches the stop 43. So the roller 8, and the portion of the web carried by the roller 8, are moved upwards, while the brakeshoe 42 presses the web lightly against the roller 8 whereby interrupting the motion of the web. The amount of pressure applied by the brakeshoe depends on the adjustment of the stop 43 on the arm 40.

Substantially at the same time the perforating member 48 is moved by the motor 49 towards the foil web sections 11, 13 and locks the web by pressing it onto the holder 50, after which the motor 41 is so activated that it turns the three-arm lever 36 clockwise through a small angle and the stop 43 is displaced a short way upwards. At the same time the tilting arm 31 is caused to make a further slight anticlockwise motion by means of the motor. During this process the brakeshoe 42 is pressed against the web on the roller 8, the swing motion of the three-arm lever 36 about the shaft 37 being taken up by the resilient arm 39. During this additional swing motion of the arm 31 the idle roller 10 is moved slightly downwards, so that the web sections 9, 11 are slackened and maintained in that state while the welding operation is performed by energization of motor 47.

When the welding and the perforation have been completed, the devices used for this purpose are again moved away from the web sections 11, 13, the brake shoe 42 being likewise moved away from the foil web. The machine is then ready for the next step which, as mentioned, is commenced by the idle roller 10 being pressed against the driving roller 28 by means of the motor 35.

Cooling air is supplied to the foil web by the cooling air nozzles 51, 52 after the welding, as described, so that the weld and the foil web region lying above it are cooled directly after or, for example, during the welding operation.

The machine described can also be used for making transverse weldings and cuttings so that loose sections are manufactured, for example, separated bags, If so, the guiding means 17, 25–27 and 19, 20 are dispensed with, and the same applies to the perforating member 48.

We claim:

1. A machine for carrying out transverse weldings in a web of plastic foil, comprising a frame (1), a feed roller (4), a pair of advancing rollers (10, 28) for advancing said foil web in stages, means (29, 30) for driving said advancing rollers, two welding jaws (45, 46) and a first motor (47) for moving said welding jaws towards each other, in which said pair of advancing rollers is arranged in the upper region of said frame, said welding jaws are arranged substantially vertically below said advancing rollers, in which said pair of advancing rollers consists of a continuously rotating driving roller (28) mounted on said frame and an idle roller (10) over which said foil web (9, 11) passes from said feed roller substantially vertically downward through said welding jaws; a substantially horizontal tilting arm (31) rotatable about a shaft (32) fixed on said frame; a second motor (35) for moving said tilting arm; means to energize and deenergize said second motor, said idle roller being mounted at one end of said tilting arm so as to be swung downward from the position, assumed when said second motor is deenergized and in which said idle roller rests in contact with said driving roller, away from the latter and toward said welding jaws; a guide roller (8) mounted on the other end of said tilting arm over which said foil web (7, 9) passes substantially horizontally to said advancing rollers; a brake block (42) mounted resiliently on said frame (1) and arranged above said guide roller in such a manner, as to press against said foil web on said guide roller, and hold it fast, when said idle roller has swung an initial part of its way downward; the section of said foil web (11, 13) between said advancing rollers and said welding jaws being slackened by then swinging said idle roller (10) the remaining part of its way downward.

2. The machine defined in claim 1 and a perforating member (48); a holder member 50; and a third motor 49 for moving said perforating member against said holder member, said perforating member and said holding member being substantially vertically below the said welding jaws, whereby said web passes vertically downward through the welding jaws and then between said perforating and holder members.

3. A machine according to claim 2; and a three-arm lever (36) rotatable about a shaft (37) fixed on said frame, said shaft being arranged obliquely above said guiding roller and remote from said tilting arm; motor means (41) for moving said three-arm lever, one arm (38) of said three-arm lever being connected with said motor means, another arm (39) of said three-arm lever (36) being resilient about the axis of its shaft (37) and extending obliquely toward said guiding roller (8) and bearing on its free end said brake block (42), and the third arm of said three-arm lever (36) extending substantially horizontally toward said tilting arm (31) and bearing at its free end a vertically adjustable stop (43) for limiting the upward movement of the end of said tilting arm (31) bearing said guiding roller (8); and means to energize said motor means after energization of second motor.

4. A machine according to claim 3 and a disc having a large number of radial slits (44), arranged on said idle roller (10); in the vicinity of said disc (44) a photocell (44′) so arranged and designed as to be activated and deactivated by passage of the slits in said disc; a control device (44″) comprising a counting device and a program emitter; said control device (44″) being so designed and operatively connected to said photocell (44′) and said first and second and third motors and said motor means (35, 41, 47, 49) as to control the following program:

a. at the beginning of a stepwise movement of said foil web through the machine with said welding jaws (45, 46) at a distance from each other and with said perforating member (48) at a distance from said holder member (50), moving said tilting arm (31) so as to move said idle roller (10) upward and bring it into contact with said driving roller (28);

b. holding said tilting arm (31) in said position till said foil web has moved for a prescribed distance through the machine;

c. moving said tilting arm (31) so as to move said idle roller (10) downward and away from said driving roller (28), thus stopping the movement of said foil web, till the corresponding upward movement of the end of said tilting arm (31) bearing said guiding roller (8) is limited by said stop (43) and said brake block (42) presses against said foil web (7, 9) on said guiding roller (8) so as to hold it fast; and substantially concurrently moving said perforating member (48) against said foil web (13) on said holder member (50) so as to hold it fast;

d. moving said stop (43) upward and moving said tilting arm (31) so as to move said idle roller (10) a corresponding additional distance downward, thus keeping said section (11, 13) of said foil web between said advancing rollers (10, 28) and said perforating member (48) and said holder member (50) slackened;

e. moving said welding jaws (45, 46) against each other for welding.

5. A machine according to claim 4, in which are provided a motor (4') for driving said feed roller (4); and a control means for intermittent rotation of said feed roller, comprising a tilting member (21) carrying a guide roller (6) which rests in a downward-hanging arch (5, 7) of said foil web, and a switch (24) cooperating with said tilting member and operationally connected to said motor.

6. A machine according to claim 5, in which are provided a takeup roller (20); a motor (20') for driving said takeup roller; and a control means for intermittent rotation of said takeup roller, comprising a tilting member (25) carrying a guide roller (17) which rests in a downward-hanging arch (16, 18) of said foil web, and a switch (27) cooperating with said tilting member and operationally connected to said motor.

7. A machine according to claim 1; and a three-arm lever (36) rotatable about a shaft (37) fixed on said frame, said shaft being arranged obliquely above said guiding roller and remote from said tilting arm; motor means (41) for moving said three-arm lever, one arm (38) of said three-arm lever being connected with said motor means, another arm (39) of said three-arm lever (36) being resilient about the axis of its shaft (37) and extending obliquely toward said guiding roller (8) and bearing on its free end said brake block (42), and the third arm of said three-arm lever (36) extending substantially horizontally toward said tilting arm (31) and bearing at its free end a vertically adjustable stop (43) for limiting the upward movement of the end of said tilting arm (31) bearing said guiding roller (8); and means to energize said motor means (41) after energization of second motor.